(12) United States Patent
Poursohi et al.

(10) Patent No.: US 8,451,323 B1
(45) Date of Patent: May 28, 2013

(54) BUILDING DATA MODELS BY USING LIGHT TO DETERMINE MATERIAL PROPERTIES OF ILLUMINATED OBJECTS

(75) Inventors: Arshan Poursohi, Berkeley, CA (US); Thor Lewis, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/611,673

(22) Filed: Sep. 12, 2012

(51) Int. Cl.
*H04N 7/18* (2006.01)
(52) U.S. Cl.
USPC ............................................. 348/46; 348/43
(58) Field of Classification Search
USPC ................... 375/240.01–240.29; 348/36–39, 348/42–60, 143–160
See application file for complete search history.

(56) References Cited

U.S. PATENT DOCUMENTS
5,495,576 A * 2/1996 Ritchey .......................... 345/420

OTHER PUBLICATIONS

Autodesk 123D Catch, Catch and carry, Turn ordinary photos into extraordinary 3D models, www.123dapp.com/catch, retrieved Jan. 2013.

* cited by examiner

*Primary Examiner* — Andy Rao
(74) *Attorney, Agent, or Firm* — McDonnell Boehnen Hulbert & Berghoff LLP (57) ABSTRACT

Disclosed are methods and systems for building data models by using light to determine material properties of illuminated objects. In an embodiment, a system includes a set of device pairs (of lighting-source and image-capture devices) arranged on the perimeter (and directed at a central region of) a 3D shape. The system iterates from an initial state through a plurality of imaging states. The initial state involves (1) an object being situated in a controlled-lighting space and (2) the device pairs being positioned within the controlled-lighting space and around the object, which is situated in the central region of the 3D shape. Each imaging state involves the activation of an imaging-state-specific subset of lighting-source and image-capture devices. The system captures image data indicative of the appearance of the object during the imaging states, and stores that data in a 3D-data model of the object.

30 Claims, 6 Drawing Sheets

BUILDING DATA MODELS BY USING LIGHT TO DETERMINE MATERIAL PROPERTIES OF ILLUMINATED OBJECTS

BACKGROUND

It is often useful in the computing, graphics, and imaging arts to build what are known and referred to herein as "three-dimensional-(3D)-data models" (and are also known as "scene files") of various real-world objects (or groups of objects, though examples involving individual objects are described herein for clarity of presentation and not by way of limitation). Once built, 3D-data models can be used in depicting the data-modeled objects, where this depicting typically involves rendering two-dimensional (2D) and/or 3D graphics, images, animations, holograms, and the like. 3D-data models can also be used by way of comparative reference by computing devices (e.g., robots) that are performing object recognition, perhaps among other tasks. And there are other examples of how 3D-data models that represent real-world objects can be utilized by one or more computing devices, as this list is not exhaustive.

In many instances, a 3D-data model of an object takes the form of (or includes) a number of data structures (perhaps organized as an array) that are stored in memory or other data storage, where each (or a certain set) of the stored data structures may correspond to (i.e., be representative of) a portion of the object. As used herein, "data structures" encompasses instantiations (also known as instances) of data structures; that is, a stored array of data structures may contain a large set of instantiations of the same underlying data structure, where differences among the respective data structures in the array may take the form of (or include) differing sets of values for the various parameters (such as spatial location, material type, color, translucence, brightness, luminescence, reflectivity, and the like) that are defined by the data structure.

Unless otherwise indicated, no subject matter described in this background section is, merely by its inclusion in this section, admitted to be prior art to any claim.

SUMMARY

Presently disclosed are methods and systems for building data models by using light to determine material properties of illuminated objects.

One embodiment takes the form of a method that involves a system iterating from an initial state through a plurality of imaging states. The system includes a set of device pairs, and each device pair includes a lighting-source device and an image-capture device that are substantially co-located. The device pairs are arranged about a 3D shape, which defines a negative internal space that has a central region at which each device pair is substantially directed. The initial state involves (1) an object being situated in a controlled-lighting space and (2) the set of device pairs being positioned within the controlled-lighting space and substantially around the object, such that the object is substantially situated in the central region. Each imaging state involves (1) the activation of an imaging-state-specific subset of the lighting-source devices in an imaging-state-specific manner and (2) the activation of an imaging-state-specific subset of the image-capture devices. The method further involves the system capturing image data that is indicative of a respective appearance of the object during the iteration through the respective imaging states. And the method further involves the system storing the captured image data as data structures of a 3D-data model of the object, where the data stored in the data structures is indicative of one or more properties of the appearance of the object.

Yet another embodiment takes the form of the system described above, where the system further includes a processor and data storage containing instructions executable by the processor for carrying out the above-described method.

Still another embodiment takes the form of a non-transitory computer-readable medium having stored thereon instructions executable by a processor for causing a system such as the system described above to carry out a method such as the method described above.

These as well as other aspects, advantages, and alternatives will become apparent to those of ordinary skill in the art by reading the following description, with reference where appropriate to the accompanying drawings.

DETAILED DESCRIPTIONS

As stated, a given 3D-data model of a given object may include individual data structures and/or sets of data structures that represent different respective portions of the given object. Examples of such portions include points (a.k.a. vertices), surfaces, regions, lines, and/or any other suitable portions. With respect to a surface as an example, a given set of data structures may represent a substantially flat (i.e., planar) surface of the object, or perhaps a curved surface of the object, among many possible examples.

In some cases, the spatial location (typically with reference to a local coordinate (e.g., $\{x,y,z\}$) system) of a given portion of a given data-modeled object may be defined by a stored set of data structures that, at least spatially, represents the given portion comprehensively (in the sense that the set includes a respective data structure for substantially every point (e.g., pixel, voxel, or the like) to be rendered); in other cases, that spatial location may be defined by a stored set of data structures that, again, spatially speaking, represents the portion of the object more sparsely (in the sense that the set does not include a respective data structure for substantially every point to be rendered, but rather only includes data structures that represent a selection of what may be deemed significant (i.e., defining) aspects of the portion, perhaps corresponding to attributes such as corners, boundaries, curvature, and the like).

Furthermore, these varying approaches to representing portions of data-modeled objects (on the gamut between what could be called representing them densely and representing them sparsely) can also be applied to representing data-modeled objects in their entirety, as a collection of individual data structures or as a collection of sets of data structures corresponding respectively to portions of the object. Furthermore, those of skill in the art will recognize that other such approaches could be used as well.

Various techniques exist in the art for generating 3D-data models of real-world objects. In some cases, these models are painstakingly manually created (by, e.g., artists, graphic designers, and the like) and then input into the 3D-data model. In other cases, a number of scans or photographs of an object from a number of different angles are painstakingly captured (e.g., during photo shoots that often consume many hours and may even consume an entire day) and then combined to assemble the model. In still other cases, a 3D scanner is used to scan an object and generate what is known as a "point cloud," which is essentially a large set of points that the scanner has determined are located on the surface of the scanned object, and which can thereafter be processed to render a 2D or 3D likeness of the object.

Typically, each point in a point cloud is determined to have a respective {x,y,z} location with reference to a local coordinate system; as such, the points in the point cloud can collectively be rendered as an at-least-rough 2D or 3D depiction of the data-modeled object. In a sense, then, a point cloud can be considered to be a starting point for a more robust 3D-data model of a real-world object. That is, a point cloud could be conceptualized as a 3D-data model in which each respective data structure of the data-modeled object is complete only as to its spatial-location (i.e., {x,y,z}) information, and is at least initially incomplete as to other attributes defined in the data structure, perhaps including material type, color, and the like.

In some cases, point clouds are fit (i.e., normalized) to pre-defined 3D-data-model constructs, which essentially are useful digital approximations of real-world (i.e., analog) features such as curved surfaces and the like. Such constructs are used in various applications and disciplines for 3D-data modeling, rendering, recognition, and the like. Some examples of such constructs include mesh models (such as triangle mesh models and polygon mesh models), surface models, computer-aided-design (CAD) models, and the like. In the art, the term "surface reconstruction" is often used as a label for this process of moving from (1) a point cloud that is representative of a data-modeled object to (2) a pre-defined 3D-data-model construct that is representative of the same object. Other techniques for building 3D-data models of real-world objects exist as well, as the list of examples described herein is not meant to be exhaustive.

Some 3D-data models of real-world objects include data structures that define properties of one or more internal portions of the data-modeled object (very likely in addition to one or more external portions of the object), while other 3D-data models of real-world objects only include data structures that define properties of one or more external portions of the data-modeled object. It is common in the art to build and use external-properties-only 3D-data models of data-modeled objects, perhaps based on a commonly held view in the art that the appearance of an object depends largely on properties of the exterior of the object.

Among other aspects, this disclosure includes description of systems, as well as methods of using such systems, that include an arrangement of a set of paired (i.e., substantially co-located) lighting-source devices and image-capture devices (where the respective pairings of lighting-source devices and image-capture devices in the set are at times referred to herein as "device pairs"). As examples, one or more of the lighting-source devices may take the form of (or at least include) one or more light-emitting diodes (LEDs) and/or one or more other suitable types of lighting-source devices, while one or more of the image-capture devices may take the form of (or at least include) a digital camera (such as a digital single-lens reflex (DSLR) camera, as an example) and/or one or more other suitable types of image-capture devices.

As used herein, the "light" that is emitted by one or more of the lighting-source devices could be or include visible light, but could also be or include infrared light, ultraviolet light, and/or any other waveform from any part or parts of the electro-magnetic (e-m) spectrum that is or are deemed suitable for a given implementation; in at least one embodiment, the light takes the form of (or at least includes) laser light.

In some example systems, the device pairs are arranged in various locations about a 3D shape within which, during operation, an object that is to be modeled would be situated. In various different embodiments, this 3D shape might take the form of, as examples, an exact or approximate sphere, an exact or approximate cube, an exact or approximate rectangular box, an exact or approximate canister, or the like.

Further, in some embodiments, the device pairs are respectively oriented such that each of the pairs is directed at substantially the same central region of the 3D shape (such that, if an object that is to be modeled were situated in such a central region, each lighting-source device could direct light onto at least part of the object, and each image-capture device could, assuming sufficient light, capture an image of at least part of the object). It is also contemplated that some or all of the respective device pairs could have their respective lighting-source device and image-capture device pointed or directed substantially along the same respective optical ray, though such an arrangement is described by way of example and is not required.

As implied above, the 3D shape—on which the device pairs may be arranged—may be shell-like, in that a negative internal space (having the above-referenced central region) would be defined by the set of device pairs. It is contemplated that the device pairs in the set could be numerous enough to collectively essentially form the 3D shape with minimal space between them, and it is also contemplated that the device pairs could be few in number and perhaps sparsely spaced about the perimeter of the 3D shape. The device pairs could be held in place by any suitable framing or structural material, or perhaps be affixed to each other in some manner so as to collectively form a shell of the 3D shape. Furthermore, other manners of accomplishing the herein-described physical arrangement of the device pairs into a 3D shape could be selected in various contexts by those in the art. Also, it is noted that the coverage of any bottom surface that such a 3D shape might have is addressed below.

Collectively, the building and utilization of a 3D-data model of a real-world object can be conceptualized into four sub-processes: (1) creating (i.e., provoking) (or at least identifying) a situation in which one or more characteristics of the object are measurable and recordable, (2) capturing data that is representative of one or more of those characteristics, (3) storing the captured data in a useful format, and (4) accessing and utilizing (e.g., rendering) the stored data. As stated above, this disclosure generally pertains to building 3D-data models by using light to determine material properties of illuminated objects. Thus, while relevant to all four of the sub-processes listed above, this disclosure is most pertinent to the first three.

As to the first of the four above-listed sub-processes, the described embodiments involve creating such a situation at least in part by starting in an initial state in which (1) the object is situated in a space where the lighting conditions are controllable (referred to herein as a "controlled-lighting space") and (2) an embodiment of the presently described system is positioned within the controlled-lighting space and substantially around the object. It is contemplated that, in some cases, satisfying the latter condition will automatically satisfy the former, in that an interior space of some embodiments would be considered a controlled-lighting space. In other cases, the controlled-lighting space will also include at least part of the ambient lighting space that surrounds given embodiments of the presently described system.

As to the first two of the four above-listed sub-processes, once the prevailing conditions satisfactorily (e.g., substantially) match the above-described initial state, the present system may (perhaps automatically, or perhaps in response to a triggering event such as receipt of a user command) systematically iterate one or more times through a plurality of what are referred to herein as "imaging states," where each imaging state involves both (i) the activation of an imaging-state-specific subset of the lighting-source devices in an imaging-state-specific manner and (ii) the activation of an imaging-state-specific subset of the image-capture devices.

As used herein, "imaging-state-specific" means "selected for that state," and does not necessarily mean "unique to that state." Thus, two or more imaging states could involve activation of the same subset of the lighting-source devices and different subsets of the image-capture devices. In the context of a given imaging state, the activation of a subset of the lighting-source devices of the system in an imaging-state-specific manner refers to selecting settings of the respective lighting-source devices with regard to one or more properties of the emitted light (such as color, intensity, and the like). Further, it is contemplated that, across the plurality of imaging states of a given embodiment, any given subset of the lighting-source devices may be activated in only one manner, or in more than one.

Furthermore, as used herein, "subset" encompasses subsets, proper subsets, and the empty set as those terms are used in discrete mathematics; in other words, a subset of a given set could consist of none, one, some, or all of the elements of the given set. As one non-limiting example, one of the imaging states could involve (i) not activating any of the lighting-source devices and (ii) capturing an image of the object using only one of the image-capture devices (using whatever ambient light (if any) is present, perhaps to set a baseline level of darkness for a high dynamic range imaging (HDRI) process, as known in the art).

Moreover, "imaging state" is used at various times in this description to refer to a system state (e.g., a hardware state), describing the particular subset of the system's lighting-source devices (and perhaps their respective selected settings, as described above) and the particular subset of the system's image-capture devices that are activated in connection with the given imaging state. However, "imaging state" may also be used at various times in this description to refer to the lighting conditions (i.e., environment) effected by the particular subset of the system's lighting-source devices (and their respective selected settings) that are activated in connection with the given imaging state.

In some embodiments, a first imaging state involves activating all of the lighting-source devices of the system and all of the image-capture devices of the system, such that multiple digital images of the object are captured at what may be deemed full system lighting.

In at least one such embodiment, what is deemed herein to be a "round-robin" set of imaging states follows the first imaging state, where the round-robin set of imaging states includes a respective state in which each respective lighting-source device is activated without any of the other lighting-source devices in the system being activated during the respective state. That is, as the system traverses through the round-robin set of imaging states, the respective lighting-source devices in the system are activated one at a time.

In connection with each imaging state in the round-robin set, it may be the case that the only image-capture device that is activated is the one that is paired with the activated lighting-source device. However, it may instead be the case that, in each imaging state in the round-robin set, the system activates every image-capture device, or perhaps every image-capture device except for the one that is paired with the activated lighting-source device. Further, various different implementations may involve many other such combinations and permutations, many of which may involve imaging states in connection with which the system activates multiple (but less than all of the) lighting-source devices. In some embodiments, a round-robin approach such as that described above may be utilized prior to a full-system-lighting imaging state; in other embodiments, such a round-robin approach may be utilized without ever executing a full-system-lighting imaging state.

Thus, it is contemplated that, depending on the specifics of a given imaging state, the corresponding set of one or more captured digital images of the appearance of the object during the given imaging state could be indicative of light that reflected off of the object, light that refracted through the object, light that passed through the object, and/or one or more other possibilities.

It is further contemplated that the set of imaging states through which the system cycles (one or more times) in connection with a given embodiment could involve states that vary one or more properties of the light being emitted from one or more of the lighting-source devices. In some embodiments, one or more of the lighting-source devices may be capable of varying the color, intensity, and/or one or more other properties of their respective emitted light; in some embodiments, the variance of one or more properties of the emitted light may be effected by virtue of the above-described selective activation of various subsets of the system's lighting-source devices. Further, other suitable variations may be selected by those of skill in the art in various contexts.

With respect to the second and third of the four above-listed sub-processes, the data that is captured and stored into data structures as part of a 3D-data model as described above may be indicative of one or more properties (in addition to spatial location) of the portion of the data-modeled object that is represented by the corresponding one or more data structures. As examples, the one or more properties that may be indicated in one or more such data structures may include type of material (e.g., glass, plastic, leather, metal, etc.), color, translucence, brightness, reflectivity, luminescence, and the like.

In various embodiments, the system may maintain (or at least have access to) a reference database that the system uses to store such properties. For example, the reference database could contain images of objects of known colors (e.g., a red block) in association with indications of their respective color (e.g., "red" (or a numerical representation of red)). As another example, the reference database could contain images of objects of known type of material (e.g., a leather boot) in association with indications of their respective type of material (e.g., "leather" (or a numerical code corresponding to leather)). In the case of one or more materials, a reference database may include what are known as spectrometer values, which are unique energy-emission signatures of various materials under certain lighting conditions; in such cases, spectrometer values of data-modeled objects under the same lighting conditions may be compared to values in the reference database for purposes of material-type identification.

As such, when the system is used to data model a new object, comparisons of the appearance of the new object at various imaging states could be automatically performed with the appearances of various objects in the reference database at corresponding imaging states. As a result of such a series of automatic comparisons, data-modeled objects bearing sufficient similarity to reference-database objects could have corresponding data indicative of color, material type, and/or one or more other properties stored in the 3D-data model corresponding to the data-modeled real-world object. A stored set of 3D-data models could therefore be made searchable by one or more such properties. For example, a user could enter a search for objects where the color equals red and the material type equals leather. Further, a similar approach could be used with one or more other properties of data-modeled objects, such as translucence, brightness, reflectivity, and/or luminescence, to name but a few examples.

In some embodiments, the system may take what those of skill in the art would characterize as a "dense" approach to gathering data points representative of the various portions of the object; that is, the system may gather (or at least attempt to gather) data on substantially all of the points on at least the exterior of the object, governed of course by the level of granularity at which a given implementation of the present system may be arranged to operate.

In other embodiments, the system may initially (i.e., preliminarily) identify what the system determines to be the various portions (in this case, likely regions) of the object that are made up of contiguous areas within which the type of material on the exterior of the object is the same, perhaps by identifying physically contiguous regions of the object that have a uniform (or at least relatively uniform) appearance in various imaging states. Once such regions have been preliminarily identified as likely having a single material type, the system may then "data sample" within the preliminarily-identified regions by collecting image data with respect to a relatively small number (as compared with "all possible") randomly or non-randomly selected points. This approach may work well in the context of building a 3D-data model of an object such as an athletic shoe, which often would have relatively large contiguous regions of various materials (such as canvas, opaque colored rubber, translucent rubber windows, and the like). Those of skill in the art may select other approaches that they deem suitable in various contexts.

In some embodiments, the stored 3D-data model (e.g., the associated mesh model) may be segmented (into multiple mesh models) along material-type boundaries, to facilitate later utilizing (e.g., rendering) the stored 3D-data model; in some instances, this segmentation may mean that what might, but for material type, be considered a single surface (e.g., face) of a data-modeled object may be subdivided by material type.

In some embodiments, data may be gathered (and added to the 3D-data model) that is representative of what are known in the art as heat signatures of various objects to which various types of light has been applied. Most objects will emit some amount of energy in the form of heat as a result of energy (in the form of light) being applied to them. Typically, heat signatures can be observed (i.e., imaged using infrared (a.k.a. "night-vision") imaging devices) in the infrared-light band of the e-m spectrum. This heat-signature data may supplement data reflecting the appearance of the object, to make the 3D-data model more accurate; in some cases, heat-signature data may be the only data available for a given portion (e.g., a bottom surface) of a data-modeled object. In practice, for instance, the object may be at rest on a surface (e.g., a ceramic surface) during the above-described iteration through various imaging states; once that is complete, the object may be removed from the surface, at which time any available heat-signature data might be captured using infrared imaging devices.

Along somewhat-analogous lines, any potential luminescence of an object may be observed by, e.g., capturing one or more images of the object at a time at which light has recently been applied, but is not currently being applied, to the object; in some cases, after light is no longer being affirmatively applied to the object, the object may still be emitting a glow that could be imaged and stored as an enhancement to the 3D-data model.

As referenced above, one manner in which a 3D-data model can be enhanced as to a bottom surface of an object is by way of examination of a surface on which the object had been resting, in order to image any latent heat-signature data in the infrared band. Another manner in which a 3D-data model can be enhanced as to a bottom surface of an object is to reposition (e.g., flip) the object and then iterate through another set of one or more imaging states in the manner described herein. Yet another manner in which a 3D-data model can be enhanced as to a bottom surface of an object is to position the object on a transparent surface (e.g., glass) through which one or more image-capturing devices are able to capture image data. Still another manner is to use x-rays to gather data regarding the bottom surface of the object.

Another manner in which a 3D-data model can be enhanced as to a bottom surface of an object is to use a surface that adapts to the object. One example of such a surface is memory foam, and another example of such as surface is an arrangement of push pins often found at children's "hands-on" or other educational museums. In some such embodiments, whether the adaptable surface includes memory foam, push pins, and/or one or more other options, position sensors may be connected to and/or integrated with any number of points (e.g., any number of pins) such that, once an object had been set on (or pressed into, etc.) such an adaptable surface, the various position sensors could be interrogated to gather data indicative of the 3D shape, contours, etc. of the bottom surface of the object to be modeled. In some cases, other arrangements of circuitry and/or other devices could be employed in addition to or instead of position sensors; for example, one or more of the "pins" in a push-pin arrangement could contain one or more other types of devices, such as a lighting-source device, an image-capture device, a pressure sensor, and/or one or more suitable devices of any other type.

In some instances, the herein-described methods and systems could be usefully applied in zero-gravity situations, such as in Earth orbit, such that resting a to-be-modeled object on a surface is not necessary. And more generally, the herein-described methods and systems could be usefully applied in contexts experiencing any degree of gravity, of which zero gravity is but one example. Along analogous lines, the herein-described methods and systems could be usefully applied in an underwater context (and more generally in any context that is submerged in any type of (Newtonian or non-Newtonian) fluid, of which water is but one example). And other applications may occur to those of skill in the art to suit various situations.

Figure 1:
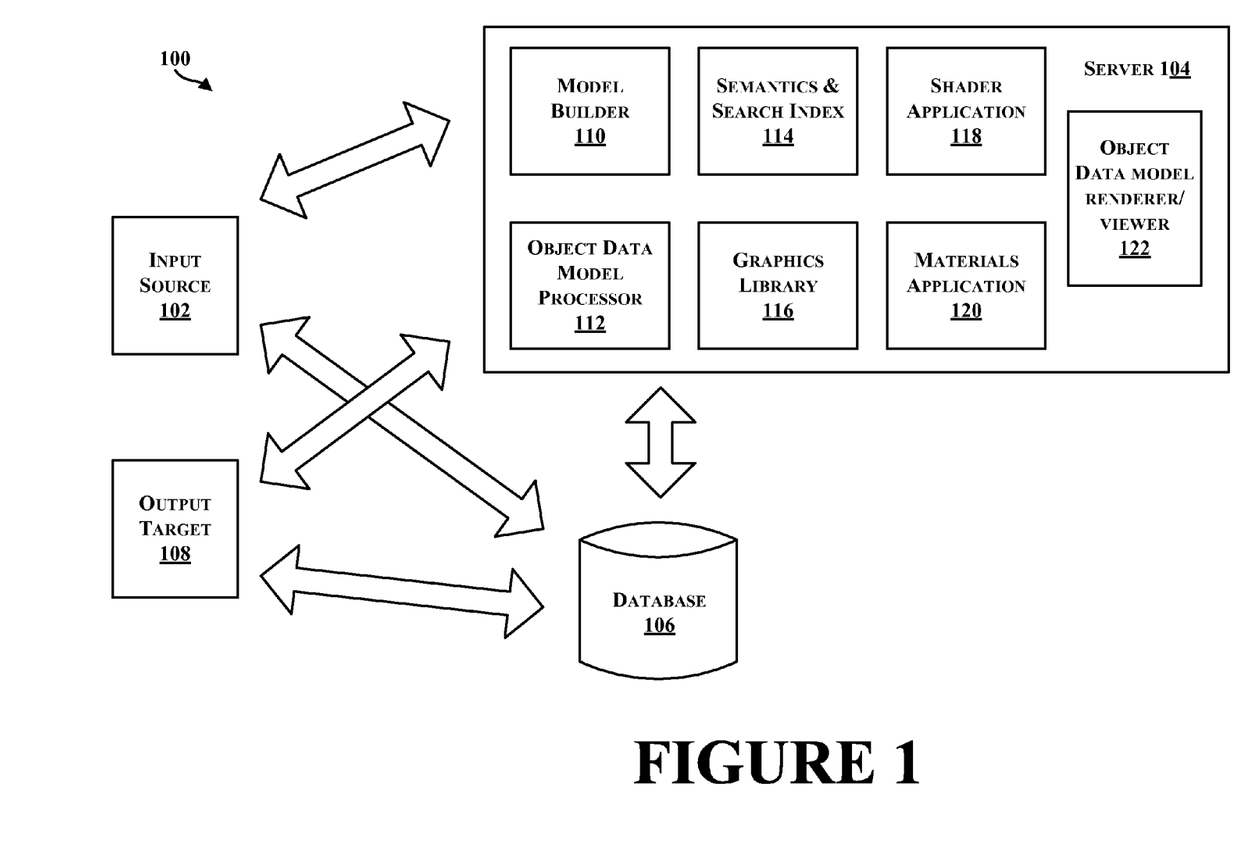
FIG. 1 depicts an example system that may be utilized for object data modeling in accordance with at least one embodiment.

FIG. 1 depicts an example system that may be utilized for data modeling in accordance with at least one embodiment. In FIG. 1, the bi-directional arrows indicate that the entities situated at the respective ends of a given arrow can, in at least one embodiment, communicate (e.g., wirelessly) with each other. The system 100 includes an input source 102, a server 104, and a database 106. The system 100 may include more or fewer components, and each of the input source 102, the server 104, the database 106, and the output target 108 may comprise multiple elements, and any two or more of them may be interconnected. One or more of the described functions of the system 100 may be distributed among one or more additional—or combined into fewer—functional and/or physical components.

Any one or more of the components of the system 100 may be coupled to and/or configured to be capable of communicating via a network (not shown) such as a local area network (LAN), wide area network (WAN), wireless (e.g., Wi-Fi) network, or the Internet, as examples.

The input source 102 may be any source from which a 3D-data model may be received by, for example, the server 104. The input source 102 is discussed more fully below in connection with FIG. 3.

The server 104 is depicted as including a model builder 110, an object data model processor 112, a semantics and search index 114, and a graphics library 116, a shader application 118, a materials application 120, and an object data model renderer/viewer 122. Any two or more of the components of the server 104 may be communicatively connected with each other, as the depiction in FIG. 1 is provided by way of example. In addition, one or more of the components of the server 104 may be implemented as a separate component communicatively connected with the server 104, which may further include a processor and memory containing instructions executable by the processor to perform functions of the components of the server 104, as examples.

The model builder 110 may receive a mesh data set for each object from the input source 102, where a given mesh set may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. In some examples, the model builder 110 or the object data model processor 112 may output a 3D-data model of an object that includes one file with a combination of all data needed to render a 3D image of the object. In other examples, the model builder 110 or the object data model processor 112 may output a 3D-data model in the form of multiple files so that the data-model file is divided into smaller parts.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or the files comprising the 3D-data model from the model builder 110 or the object data model processor 112, and may be configured to label portions of the file or each file individually with identifiers related to attributes of the file.

In some examples, the semantics and search index 114 may be configured to provide annotations for aspects of the 3D-data models. For instance, an annotation may be provided to label or index aspects of color, texture, shape, appearance, description, function, etc., of an aspect of a 3D-data model. Annotations may be used to label any aspect of an image or 3D-data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh-compression module to reduce a mesh file size, for example. The graphics library 116 may provide the 3D-data model in a form for display on a browser, for example. In some examples, a 3D-data model viewer may be used to display images of the 3D objects data models. The 3D object data model viewer may be implemented using WebGL within a web browser, or OpenGL, as examples.

The shader application 118 may be configured to apply a shader to portions of the 3D-data-model file or to files of the 3D-data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

Further in connection with rendering, the materials application 120 may be configured to respectively apply an appearance of various materials to portions of the 3D-data model file or to files of the 3D-data model according to the indexes of the file (as labeled by the semantics and search index 114) to generate a 3D image. The materials application 120 may be executed to apply an appearance of a given material from a number of materials according to the indexes of the file. The materials application may apply appearances of any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions so that the materials application 120 can be executed to render the separate distinct portions. As an example, a hood on a car may include a hood ornament, and the hood may be painted and the ornament may be chrome. The materials application 120 and the shader application 118 can be executed to identify two separate materials and render each material with an appropriate shade.

The object data model renderer/viewer 122 may receive the 3D-data model file or files and execute the shader application 118 and the materials application 120 to render a 3D image. The database 106 may store all data sets for a 3D object data model in any number of various forms from raw data captured to processed data for display. The output target 108 may include one or more webpages, one or more 3D-data-model viewers, one or more search engines, and/or one or more databases, among other examples.

Figure 2:
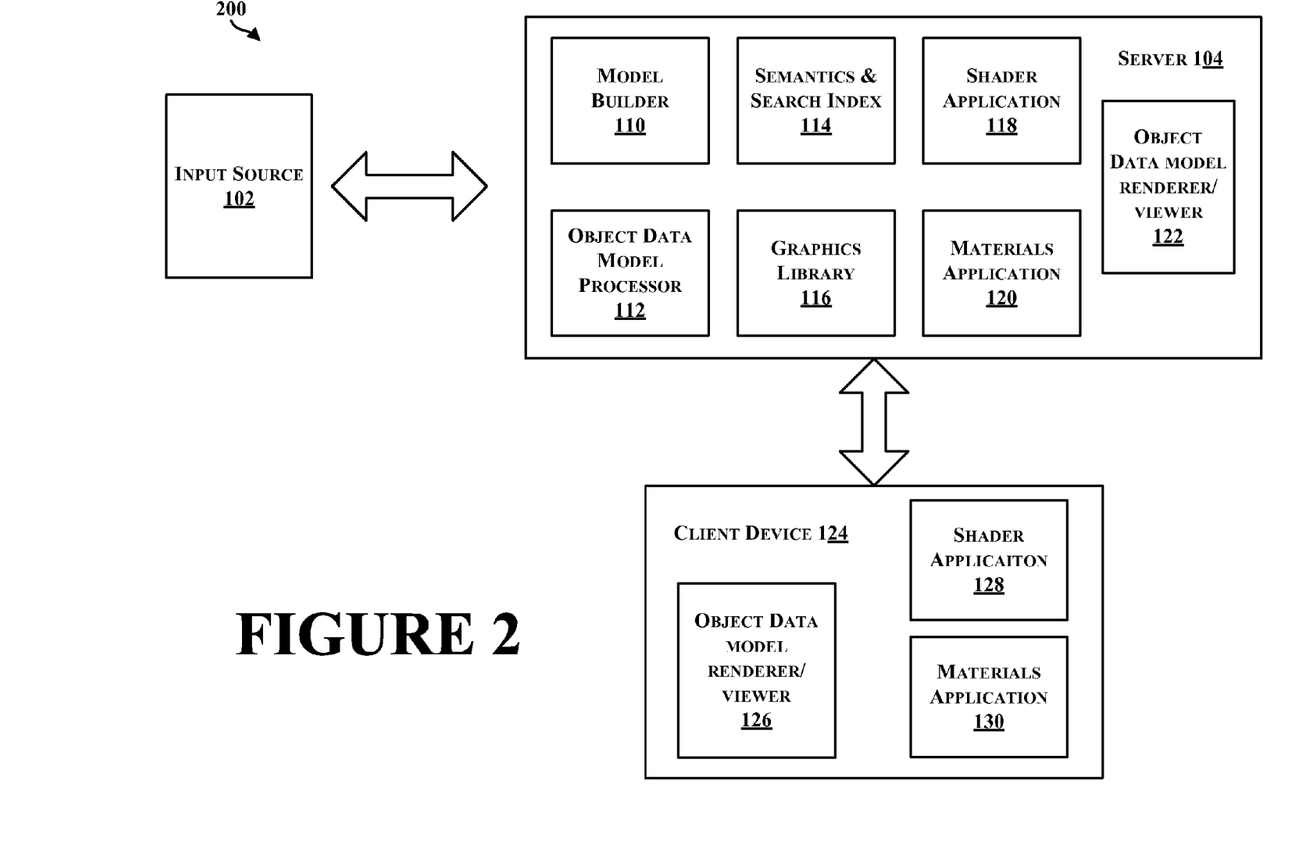
FIG. 2 depicts another example system that may be utilized for object data modeling in accordance with at least one embodiment.

FIG. 2 depicts another example system that may be utilized for object data modeling in accordance with at least one embodiment. The system 200 includes the input source 102 communicatively connected with the server 104, which is communicatively connected with a client device 124. The input source 102 and the server 104 may be as described in FIG. 1. The client device 124 may receive outputs from any of the components of the server 104, and may be configured to render a 3D image.

The client device 124 includes an object data model renderer/viewer 126, a shader application 128, and a materials application 130. The object data model renderer/viewer 126, the shader application 128, and the materials application 130 may all be configured as described with respect to the object data model renderer/viewer 122, the materials application 120, and the shader application 118 of the server 104 as described in connection with FIG. 1.

In some examples, the client device 124 may receive a 3D-data model file or files from the server 104 and render a 3D image of the object by executing the shader application 128 and the materials application 130. When executing the shader application 128 and the materials application 130, the client device 124 may access separate databases to retrieve appropriate shader and material information to apply to the image, access the server 104 to receive appropriate shader and material information from the shader application 118 and the materials application 120, or may store information locally regarding the appropriate shader and material information to apply. In other examples, the server 104 may render a 3D image of the object and stream the 3D image to the client device 124 for display.

As described, in some examples, the 3D-data model may include various forms of data, such as raw captured image data, mesh data, processed data, etc. Data of the 3D-data model may be encoded and compressed so as to store information related to 3D geometry of an object associated with information related to appearance of the object for transmission and display within a web browser or application on a device, as examples.

In some examples, a 3D-data file includes information as to geometry of an object sorted by material and divided into portions to be loaded as fragments and reassembled in portions by the client device or other viewer. As one example, if the data-modeled object is a mobile phone that includes multiple portions, each portion may be rendered using a separate or distinct shader for each material. Thus, the 3D-data file may be divided into multiple portions and compressed as described above to retain all portions. The client device may receive the compressed 3D-data file, decompress the file, and reassemble the portions of the object one-by-one by loading each fragment of the file, and perhaps streaming file requests for each shader.

Figure 3:
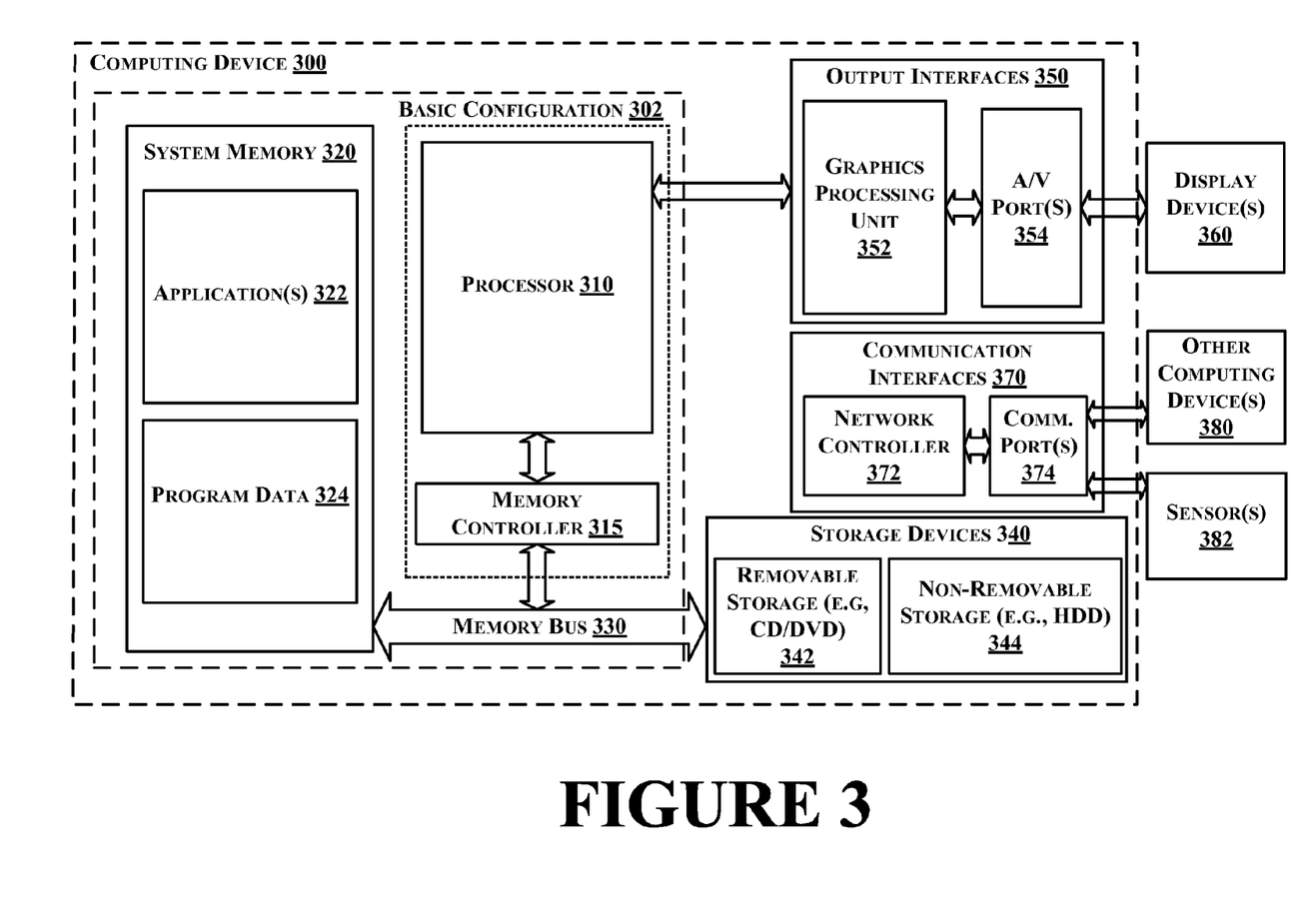
FIG. 3 is a functional block diagram illustrating an example computing device used in a computing system that is arranged in accordance with at least one embodiment.

FIG. 3 is a functional block diagram illustrating an example computing device used in a computing system that is arranged in accordance with at least some embodiments. In accordance with a basic configuration 302, computing device 300 may include one or more processors 310 and system memory 320. A memory bus 330 can be used for communicating between processor 310 and system memory 320. Depending on the desired configuration, processor 310 can be of any type including but not limited to a microprocessor (µP), a microcontroller (µC), a digital signal processor (DSP), or any combination thereof. A memory controller 315 can also be used with the processor 310, or in some implementations, the memory controller 315 can be an internal part of the processor 310.

Depending on the desired configuration, the system memory 320 can be of any type including but not limited to volatile memory (such as RAM), non-volatile memory (such as read-only memory (ROM), flash memory, etc.) or any combination thereof. System memory 320 may include one or more applications 322 and program data 324. In some embodiments, application 322 can be arranged to operate with program data 324 on an operating system.

Computing device 300 can have additional features or functionality, and additional interfaces to facilitate communications between the basic configuration 302 and any devices and interfaces. For example, data storage devices 340 can be provided including removable storage devices 342, non-removable storage devices 344, or a combination thereof. Examples of removable storage and non-removable storage devices include magnetic disk devices such as flexible disk drives and hard-disk drives (HDD), optical disc drives such as compact-disc ROM (CD-ROM) drives or digital video (or versatile) disc (DVD) drives, solid state drives (SSDs), and tape drives to name a few. Computer storage media can include volatile and nonvolatile, non-transitory, removable and non-removable media implemented in any method or technology for storage of information, such as computer readable instructions, data structures, program modules, or other data.

System memory 320 and storage devices 340 are examples of computer storage media, which encompasses but is not limited to RAM, ROM, Electrically Erasable Programmable ROM (EEPROM), flash memory, other memory technology, CD-ROM, DVD, other optical storage, magnetic cassettes, magnetic tape, magnetic disk, other magnetic storage devices, and/or any other non-transitory medium or media that can be used to store the information that can later be accessed by the computing device 300. Any such computer storage media can be part of—or separate from, but still accessible to—the computing device 300.

The computing device 300 can also include output interfaces 350 that may include a graphics-processing unit 352, which can be configured to communicate to various external devices such as display devices 360 or speakers via one or more A/V ports or a communication interface 370. The communication interface 370 may include a network controller 372, which can be arranged to facilitate communications with one or more other computing devices 380 and one or more sensors 382 over a network communication via one or more communication ports 374. The one or more sensors 382 are shown external to the computing device 300, but one or more of them could be internal to the device.

Figure 4:
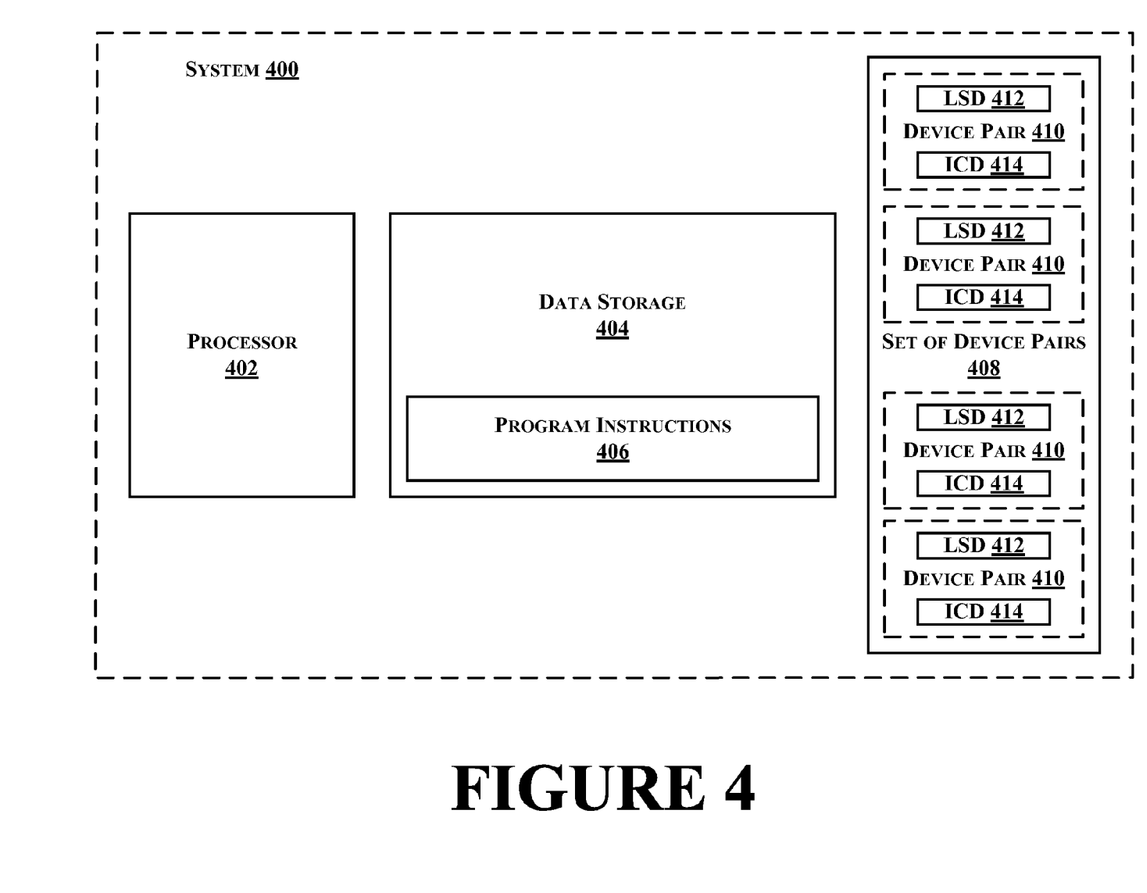
FIG. 4 is a simplified block diagram of an example system, in accordance with at least one embodiment.

FIG. 4 is a simplified block diagram of a system, in accordance with at least one embodiment. Conceptually, the system 400 that is depicted in FIG. 4 can be thought of as, for the most part, corresponding to the input source 102 of FIGS. 1 and 2, though that is not to say that the system 400 could not and does not perform one or more functions described above as being carried out by an entity external to the input source 102. Rather, the high-level comparison made here between the system 400 and the input source 102 is that both serve the initial functions of creating a situation in which characteristics can be measured (e.g., by selectively shining various light sources at and/or through the data-modeled object), capturing those measurable characteristics (e.g., by selectively activating various image-capture devices as described above), and storing those captured characteristics at least long enough to provide that stored characteristic data to an entity (such as the server 104) that can transition the stored characteristic data into an at-least semi-permanently stored, ready-to-be rendered 3D-data model.

Of course, the precise distribution of functions between the input source 102 (or a system such as the system 400)—with respect to, for example, the conversion of the so-called "raw data" to a ready-to-be-rendered 3D-data model—could be done in a number of different ways that would suit a number of different implementations. Such a design choice is within the discretion and skill of a person having ordinary skill in the art. With respect to its particular architecture, the system 400 may have some or all of the structure described with respect to the computing device 300 of FIG. 3; for example, the system 400 may have a processor, and may also have data storage that contains instructions executable by its processor for carrying out a set of functions, such as the set of functions described below in connection with FIG. 6.

In addition to having a processor 402 and data storage 404 (containing program instructions 406) as described above, the system 400 is depicted in FIG. 4 as also including a set 408 of device pairs, where each device pair 410 in the set 408 includes both a lighting-source device (LSD) 412 and an image-capture device (ICD) 414.

Figure 5:
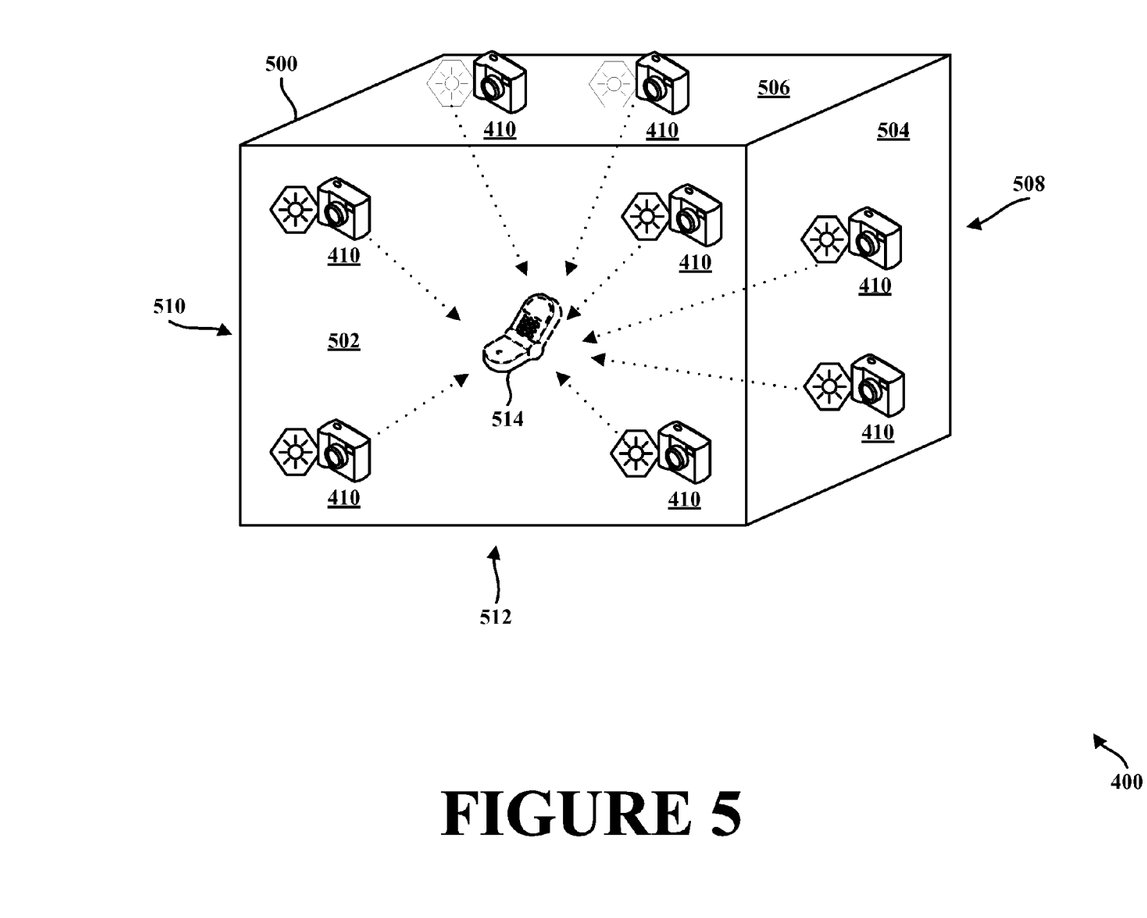
FIG. 5 is a depiction of an example system, in accordance with at least one embodiment.

In at least one embodiment, and as depicted in FIG. 5, the device pairs 410 in the set 408 are arranged about a perimeter of a 3D shape. In FIG. 5, the system 400 is depicted using a cube 500 as an example of a 3D shape. The cube 500 has a front face 502, a right-hand face 504, a top face 506, a back face 508 (not shown), a left-hand face 510 (not visible), and an open bottom side 512 (not visible). The cube 500 is substantially hollow, and therefore its shell structure defines a negative space inside. That space has a central region at which a to-be-modeled (or being-modeled) object 514 would be situated. In this example, the object 514 is a cell phone (that is depicted in dashed lines due to being located inside the cube 500).

As also depicted in FIG. 5, each device pair 410 (which each include a lighting-source device 412 and an image-capture device 414 that are not individually labeled in FIG. 5, but which are represented graphically in each device pair 410 using a light-source symbol and a digital-camera symbol) is directed substantially at the central region of the cube 500; this direction of all of the device pairs 410 towards a common central region of the cube 500 is depicted in FIG. 5 using dashed arrows.

Thus, in operation, the surfaces 502-510 of the cube 500 could be made or perhaps coated with an opaque material, such that the interior space of cube 500 thereby becomes a controlled-lighting space. The cube 500 could then be set over top of an object (such as the cell phone 514) that is to be modeled. Further, it is noted that the device pairs are connected to a controller (e.g., the processor 402) by respective wired and/or wireless links (not depicted), such that the controller can issue commands to the devices making up the device pairs, and such that data captured by the device pairs can be conveyed back to the controller.

Figure 6:
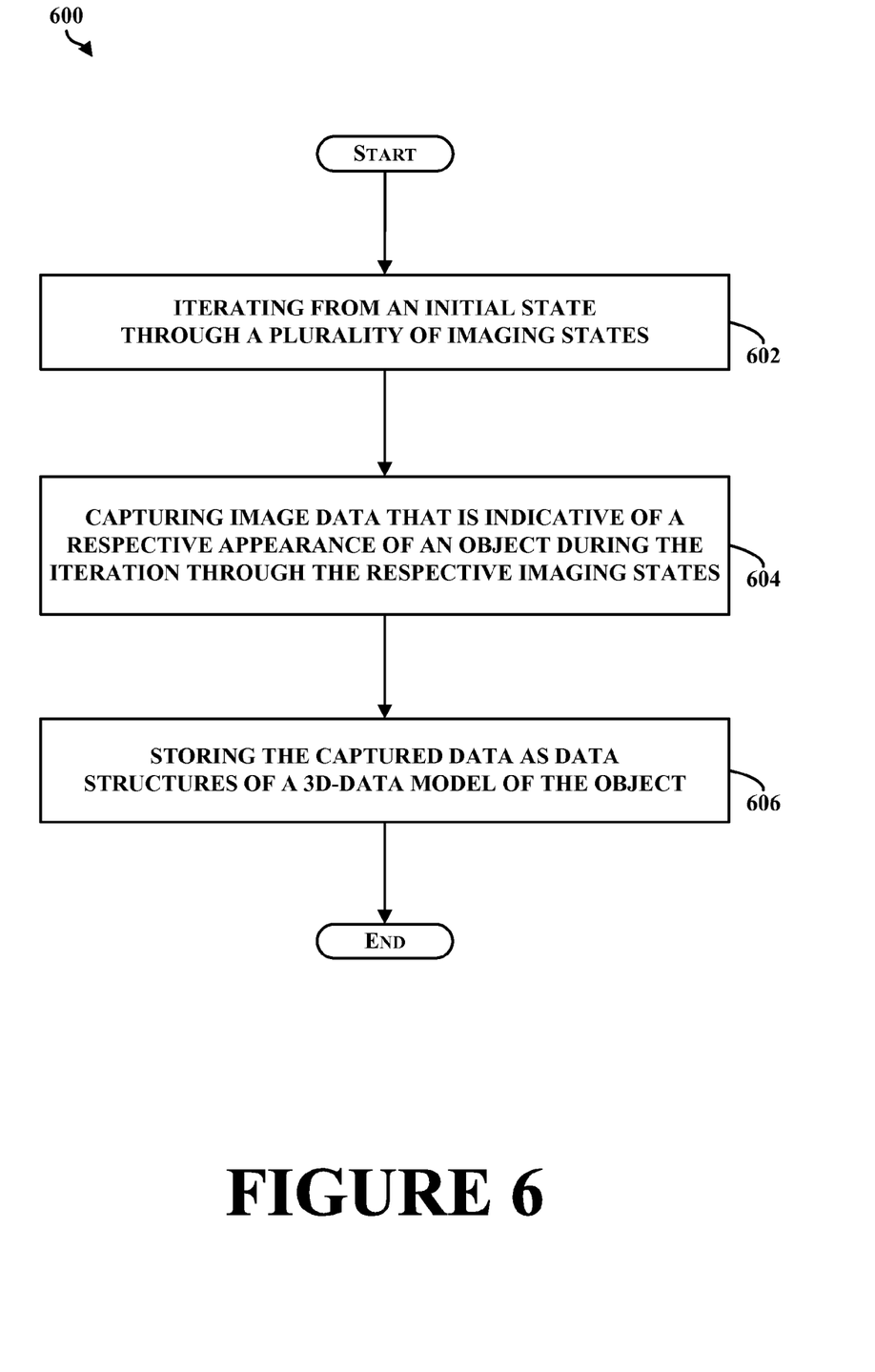
FIG. 6 is a flowchart of a method, in accordance with at least one embodiment.

FIG. 6 is a flowchart of a method, in accordance with at least one embodiment. As depicted in FIG. 6, the method 600 begins at step 602, with the system 400 (perhaps embodied, in this example, in the cube 500) iterating from an initial state through a plurality of imaging states. As described above, the system 400 includes a set 408 of device pairs 410, where each device pair 410 in the set includes a lighting-source device 412 and an image-capture device 414. Moreover, the device pairs 410 are arranged about a 3D shape, such as the cube 500, that defines a negative internal space having a central region. Also, each device pair 410 is directed substantially at that central region.

The above-mentioned initial state involves (1) an object 514 being situated in a controlled-lighting space and (2) the set 408 of device pairs 410 being positioned within the controlled-lighting space and substantially around the object 514, such that the object is substantially situated in the above-mentioned central region. Furthermore, each imaging state involves (1) the activation, in an imaging-state-specific manner, of an imaging-state-specific subset of the lighting-source devices 412 of the system 400 and (2) the activation of an imaging-state-specific subset of the image-capture devices 414 of the system 400.

One or more of the lighting-source devices may include one or more light-emitting diodes. Furthermore, one or more of the lighting-source devices could be arranged to emit one or more of visible light, infrared light, ultraviolet light, and laser light. One or more of the image-capture devices could include a digital camera, which could be a digital single-lens reflex camera. One or more of the device pairs may have its respective lighting-source device and respective image-capture device directed along substantially the same respective optical ray.

The 3D shape could be a sphere, a cube, a rectangular box, or a canister, among many other possibilities. The device pairs in the set of device pairs may collectively substantially form the 3D shape. In other cases, the device pairs in the set of device pairs could be spaced apart about the perimeter of the 3D shape.

The plurality of imaging states could include a first imaging state that involves activation of all of the lighting-source devices of the system and all of the image-capture devices of the system.

Furthermore, the plurality of imaging states could include a round-robin set of imaging states, where the round-robin set includes a respective state in which each respective lighting-source device is activated one at a time. In some such embodiments, in connection with each respective imaging state in the round-robin set, the only image-capture device in the set of device pairs that is activated may be the image-capture device that is paired with the activated lighting-source device. In other such embodiments, in connection with each respective imaging state in the round-robin set, the system may activate every image-capture device in the set of device pairs; in still other embodiments, in connection with each respective imaging state in the round-robin set, the system may activate every image-capture device in the set of device pairs except for the image-capture device that is paired with the activated lighting-source device. And certainly other possibilities abound.

In some embodiments, at least one activation of an imaging-state-specific subset of the lighting-source devices of the system in an imaging-state-specific manner involves setting at least one of the color of the light and the intensity of the light emitted by at least one lighting-source device in that particular imaging-state-specific subset.

The method continues at step 604, with the system 400 capturing image data that is representative of a respective appearance of the object 514 during the iteration through the respective imaging states (by way of the herein-described activation of various image-capture devices in various imaging states).

The method continues further at step 606, with the system 400 storing the captured image data as data structures of a 3D-data model of the object 514, wherein the data stored in the data structures is indicative of one or more properties of the appearance of the object 514. In some instances, storing the captured image data as data structures of a 3D-data model of the object involves storing multiple meshes segmented by material type. In some embodiments, the one or more properties of the appearance of the object include one or more of type of material, color, translucence, brightness, reflectivity, heat signature, and luminescence.

In various embodiments, the system 400 captures data (e.g., image data) that is representative of an appearance of a bottom side of the object 514. The system 400 might do this by capturing image data through a transparent surface over which the object 514 is positioned. As another option, the system 400 could capture such data using x-rays, memory foam, a push-pin arrangement analogous to those often found in children's educational museums, perhaps where one or more of the push pins in the push-pin arrangement include at least one of a lighting-source device, an image-capture device, and a pressure sensor. Further, various combinations of these approaches could be used as well.

The method 600 could be carried out in a zero-gravity environment (or in one that is experiencing any other degree of gravity, of which zero gravity is but one example). As another possibility, the method 600 could be carried out in an underwater environment (and more generally in any environment that is submerged in any type of (Newtonian or non-Newtonian) fluid, of which water is but one example).

This disclosure describes various embodiments; these are provided for illustration and not by way of limitation. To the extent that one or more embodiments or alternatives are described herein as being "exemplary," it is affirmatively stated that this descriptor is used to mean "serving as an example, instance, or illustration" and not to indicate that that which it modifies is considered to be preferred or to be particularly (or even relatively) advantageous. Furthermore, those having skill in the art will understand that various aspects of this disclosure can be rearranged, combined, distributed, or otherwise modified in a wide variety of ways without departing from its overall scope or spirit.

We claim:

1. A method comprising:
    a system iterating from an initial state through a plurality of imaging states, wherein:
        the system comprises a processor and data storage containing instructions executable by the processor for carrying out the method,
        the system comprises a set of device pairs, each device pair comprising a lighting-source device and an image-capture device,
        the initial state involves (1) an object being situated in a controlled-lighting space and (2) the set of device pairs being positioned within the controlled-lighting space and substantially around the object, and
        each imaging state involves (1) the activation of an imaging-state-specific subset of the lighting-source devices in an imaging-state-specific manner and (2) the activation of an imaging-state-specific subset of the image-capture devices;
    the system receiving image data that is indicative of a respective appearance and composition of the object during the iteration through the respective imaging states;
    determining, based on the image data, information indicative of a plurality of separate regions in the object that are of a substantially similar appearance and composition; and
    the system storing the image data as data structures of a 3D-data model of the object, wherein the data stored is indicative of one or more properties of the appearance and composition of the object and the information indicative of the plurality of separate regions in the object that are of the substantially similar appearance and composition.

2. The method of claim 1, wherein one or more of the lighting-source devices is arranged to emit one or more of visible light, infrared light, ultraviolet light, and laser light.

3. The method of claim 1, wherein one or more of the device pairs has its respective lighting-source device and its respective image-capture device directed substantially along the same respective optical ray.

4. The method of claim 1, wherein the controlled-lighting space substantially resembles a 3D shape that comprises a sphere, a cube, a rectangular box, or a canister.

5. The method of claim 1, wherein the plurality of imaging states comprises a first imaging state that involves activation of all of the lighting-source devices of the system and all of the image-capture devices of the system.

6. The method of claim 1, wherein the plurality of imaging states comprises a round-robin set of imaging states, wherein the round-robin set includes a respective state in which each respective lighting-source device is activated one at a time.

7. The method of claim 6, wherein, in connection with each respective imaging state in the round-robin set, the only image-capture device in the set of device pairs that is activated is the image-capture device that is paired with the activated lighting-source device.

8. The method of claim 6, wherein, in connection with each respective imaging state in the round-robin set, the system activates every image-capture device in the set of device pairs.

9. The method of claim 6, wherein, in connection with each respective imaging state in the round-robin set, the system activates every image-capture device in the set of device pairs except for the image-capture device that is paired with the activated lighting-source device.

10. The method of claim 1, wherein at least one activation of an imaging-state-specific subset of the lighting-source devices of the system in an imaging-state-specific manner comprises setting at least one of a color of the light and an intensity of the light emitted by at least one lighting-source device in that particular imaging-state-specific subset.

11. The method of claim 1, wherein storing the image data as data structures of the 3D-data model of the object comprises storing multiple meshes segmented by material type.

12. The method of claim 1, wherein the one or more properties of the appearance and composition of the object include one or more of type of material, color, translucence, brightness, reflectivity, luminescence, and heat signature.

13. The method of claim 1, further comprising the system receiving, through a transparent surface, image data representative of an appearance and composition of a bottom of the object.

14. The method of claim 1, further comprising the system using one or more of x-rays, memory foam, and a push-pin arrangement to receive data representative of an appearance and composition of a bottom of the object.

15. The method of claim 1, further comprising:
    comparing the image data corresponding to one or more of the imaging states with image data that is stored in a reference database and that corresponds to the one or more of the imaging states; and
    the system, based on the comparing, selecting values from the reference database to be stored in the 3D-data model of the object as being indicative of one or more properties of the appearance and composition of the object.

16. A system comprising:
    a set of device pairs, each device pair comprising a lighting-source device and an image-capture device;
    a processor; and
    data storage containing instructions executable by the processor for carrying out a set of functions, the set of functions including:
        iterating from an initial state through a plurality of imaging states, wherein:
            the initial state involves (1) an object being situated in a controlled-lighting space and (2) the set of device pairs being positioned within the controlled-lighting space and substantially around the object, and
            each imaging state involves (1) the activation of an imaging-state-specific subset of the lighting-source devices in an imaging-state-specific manner and (2) the activation of an imaging-state-specific subset of the image-capture devices;

receiving image data that is indicative of a respective appearance and composition of the object during the iteration through the respective imaging states;

determining, based on the image data, information indicative of a plurality of regions in the object that are of a substantially similar appearance and composition; and storing the image data as data structures of a 3D-data model of the object, wherein the data stored is indicative of one or more properties of the appearance and composition of the object and the information indicative of the plurality of regions in the object that are of the substantially similar appearance and composition.

17. The system of claim 16, wherein one or more of the lighting-source devices comprises one or more light-emitting diodes.

18. The system of claim 16, wherein one or more of the lighting-source devices is arranged to emit one or more of visible light, infrared light, ultraviolet light, and laser light.

19. The system of claim 16, wherein one or more of the image-capture devices comprises a digital camera.

20. The system of claim 19, wherein at least one digital camera comprises a digital single-lens reflex camera.

21. The system of claim 16, wherein one or more of the device pairs has its respective lighting-source device and its respective image-capture device directed substantially along the same respective optical ray.

22. The system of claim 16, wherein the controlled-lighting space substantially resembles a 3D shape that comprises a sphere, a cube, a rectangular box, or a canister.

23. The system of claim 16, wherein the controlled-lighting space substantially resembles a 3D shape, and wherein the device pairs in the set of device pairs collectively substantially form the 3D shape.

24. The system of claim 16, wherein the controlled-lighting space substantially resembles a 3D shape, and wherein the device pairs in the set of device pairs are spaced apart about a perimeter of the 3D shape.

25. The system of claim 16, the set of functions further including the system using one or more of x-rays, memory foam, and a push-pin arrangement to receive data representative of an appearance and composition of a bottom of the object.

26. The system of claim 25, wherein one or more of the push pins in the push-pin arrangement comprises at least one of a lighting-source device, an image-capture device, and a pressure sensor.

27. The system of claim 16, arranged to carry out the set of functions in a zero-gravity environment.

28. The system of claim 16, arranged to carry out the set of functions in an environment that is submerged in a fluid.

29. A non-transitory computer-readable medium having stored thereon instructions executable by a processor for causing a system to carry out a set of functions, the set of functions including:

iterating from an initial state through a plurality of imaging states, wherein:

the system comprises a set of device pairs, each device pair comprising a lighting-source device and an image-capture device, the initial state involves (1) an object being situated in a controlled-lighting space and (2) the set of device pairs being positioned within the controlled-lighting space and substantially around the object, and each imaging state involves (1) the activation of an imaging-state-specific subset of the lighting-source devices in an imaging-state-specific manner and (2) the activation of an imaging-state-specific subset of the image-capture devices;

receiving image data that is indicative of a respective appearance and composition of the object during the iteration through the respective imaging states;

determining, based on the image data, information indicative of a plurality of separate regions in the object that are of a substantially similar appearance and composition; and storing the image data as data structures of a 3D-data model of the object, wherein the data stored is indicative of one or more properties of the appearance and composition of the object and the information indicative of the plurality of separate regions in the object that are of the substantially similar appearance and composition.

30. The method of claim 1, further comprising:

determining, based on the image data, one or more properties of the plurality of separate regions in the object that correspond to an optical property of a material type of the plurality of separate regions due to interaction with light from the lighting-source device.

* * * * *